A. H. PEYCKE.
SIDE FRAME.
APPLICATION FILED MAY 12, 1915.
1,165,707. Patented Dec. 28, 1915.
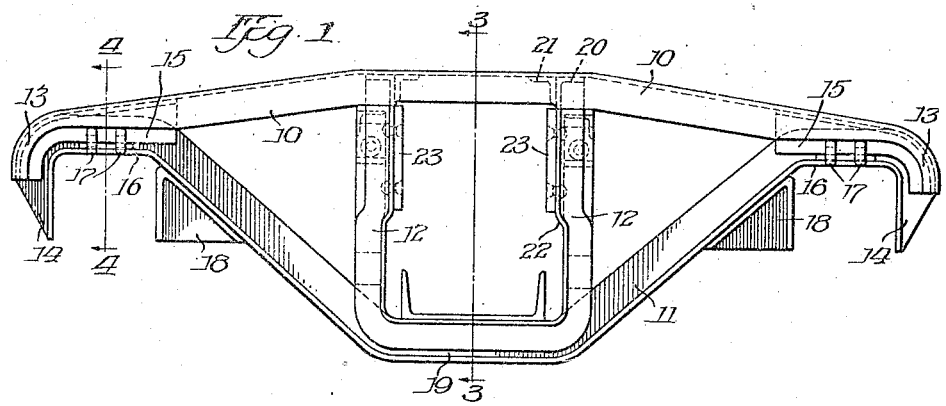
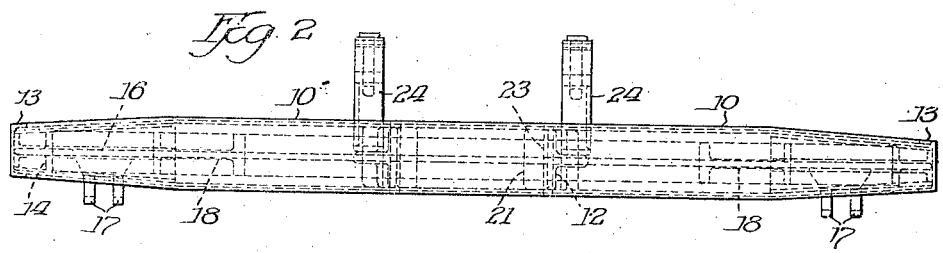
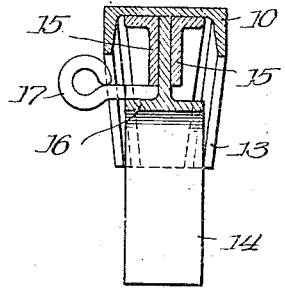
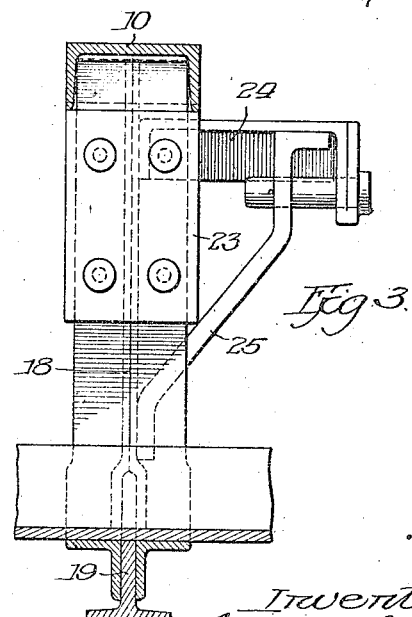

UNITED STATES PATENT OFFICE.

ARMAND H. PEYCKE, OF CHICAGO, ILLINOIS, ASSIGNOR TO AMERICAN STEEL FOUNDRIES, OF NEW YORK, N. Y., A CORPORATION OF NEW JERSEY.

SIDE FRAME.

1,165,707. Specification of Letters Patent. Patented Dec. 28, 1915.

Application filed May 12, 1915. Serial No. 27,507.

*To all whom it may concern:*

Be it known that I, ARMAND H. PEYCKE, a citizen of the United States, and resident of Chicago, in the county of Cook and State of Illinois, have invented certain new and useful Improvements in Side Frames, of which the following is a specification.

My invention relates to car trucks and has particular reference to a novel side frame for use in connection therewith.

A desirable object in car truck construction is to provide side frames which shall combine the elements of rigidity, strength, minimum weight and economy in construction. Some of these objects may be attained in the use of cast steel frames, but such frames are quite heavy and their cost is greater than that of a properly designed frame of rolled or pressed material. In the construction herein disclosed I have provided for maximum strength by so locating the different elements as to secure the greatest efficiency. Furthermore, the disposition of metal provides for great rigidity, and by welding the parts together the frame has the attributes of a single casting.

The invention will be more readily understood by reference to the accompanying drawings, wherein—

Figure 1 is a side elevation of a side frame constructed in accordance with my invention, Fig. 2 is a plan view thereof, Fig. 3 is a section on the line 3—3 of Fig. 1, and Fig. 4 is a section on the line 4—4 of Fig. 1.

Referring more particularly to the drawings, it will be seen that I provide compression member 10, tension member 11 and intermediate struts 12. The compression member, as best shown in Fig. 3, may consist of a channel, the ends 13 of which are bent downward and coöperate with the ends 14 of the tension member to provide jaws between which a journal box may be located. At the ends the flanges of the channel may be reduced somewhat in vertical height, and, to provide a reinforcement, I may locate angles 15, one on each side of the web of the T-shaped tension member. These angles are likewise bent to the curvature of the compression member and terminate at the same point. Also combined with the flange 16 of the tension member are a pair of apertured ears or lugs 17 which may act as an attaching means for a journal box.

In order to complete the bearing for the journal box, I locate a casting 18 alongside the flange of the tension member, as best shown in Fig. 1. The wide flanges 16 of the tension member 11, at the point 14, provides for a large bearing for the journal box. The struts 12 are preferably composed of a pair of angles placed back to back, then welded together along the line 18, then bent into U shape, one angle lying on each side of the web 19 of the T-shaped tension member. At the upper end of the U I bend one of the flanges 20 at right angles, this bent portion lying against the web of the channel compression member. As an added reinforcement, I may locate angles 21 on the opposite side from the bent portion 20. As shown in Fig. 1, the struts may be offset, as at 22, to provide an enlarged opening. Above the enlarged opening I prefer to mount wearing plates 23, which may be secured to the struts by counter-sunk rivets. A brake hanger bracket 24 is secured to the struts, and a brace 25 is welded to the struts and lies against the outer end of the bracket 24.

It is intended that all the parts heretofore described shall be united by electric spot welding, and for this reason no rivets or other attaching means are shown. By the use of the spot welding process, the parts may be rigidly united and the function of an integral casting is secured. I am thereby able to secure the rigidity of a casting with the tensile strength and lightness of weight of rolled or pressed metal structures. This results in economy, both in weight and cost of construction.

It will be understood that the parts are to be welded at the points at which the rivets are usually applied in building up trusses. For instance, the tension and compression members are welded together at their ends at a plurality of points in their engagement; the block, or part, 18 is welded to the tension member, the struts are welded to each other and to the compression member at the top, as well as to the tension member at the bottom, the brake hanger brackets 24, 25 are welded to the strut, the lugs 17 for the journal box fastening devices are welded over the pedestals and the reinforcing angles 15 are welded to the webs of the compression and tension members.

I claim:

1. In a side frame, the combination of a channel-shaped compression member, a T-shaped tension member, and a strut, said compression and tension members being interlocked at their ends and united by welding to form a substantially integral structure, substantially as described.

2. In a side frame, the combination of a channel compression member and a T-shaped tension member formed from commercial shapes, the ends of the member being bent downward to form a pedestal jaw, and a strut forming columns, said columns being composed of angular shapes, the parts being united by welding, substantially as described.

3. In a side frame, the combination of compression member, tension member and strut, said tension member being composed of a commercial T shape, the web of which is disposed vertically and the flanges horizontally beneath said web, the ends of the tension member being extended over the top of the journal box opening and bent downward to form a jaw, substantially as described.

Signed at Chicago, Illinois, this 10th day of May, 1915.

ARMAND H. PEYCKE.

Witnesses:
C. V. MURRAY,
T. D. BUTLER.